(12) United States Patent
Curlee et al.

(10) Patent No.: US 8,104,588 B2
(45) Date of Patent: Jan. 31, 2012

(54) CHOCK APPARATUS

(75) Inventors: Dennis Ray Curlee, Indianapolis, IN (US); David Eric Curlee, Indianapolis, IN (US); Steven Richard Fox, New Castle, IN (US); Fu Yong Gang, Zhejiang (CN); Jin Yueming, Zhejiang (CN)

(73) Assignee: Cardinal Equipment Co., Inc, Greenwood, IN (US)

( * ) Notice: Subject to any disclaimer, the term of this patent is extended or adjusted under 35 U.S.C. 154(b) by 244 days.

(21) Appl. No.: 12/494,880

(22) Filed: Jun. 30, 2009

(65) Prior Publication Data
US 2010/0065714 A1   Mar. 18, 2010

(51) Int. Cl.
*B60T 3/00* (2006.01)
*A47F 7/04* (2006.01)

(52) U.S. Cl. .............. 188/32; 211/20; 211/22; 248/671; 248/351

(58) Field of Classification Search .................. 248/671, 248/351, 143, 139, 371, 372.1, 398, 313, 248/316.2, 349.1; 211/20, 22, 21, 23, 24; 188/32; 224/924; 254/131, 133 R, 120; 74/54–56, 567, 569; 16/256, 277, 280, 284, 16/285, 303
See application file for complete search history.

(56) References Cited

U.S. PATENT DOCUMENTS

| | | | |
|---|---|---|---|
| 767,553 A | 8/1904 | Edgelow |
| 1,116,946 A | 11/1914 | Spiess |
| 1,915,024 A | 6/1933 | Logette et al. |
| 2,237,620 A | 4/1941 | Doughty et al. |
| 2,471,756 A | 5/1949 | Larson |
| 2,573,728 A | 11/1951 | Pugh, Sr. |
| 3,430,983 A | 3/1969 | Jones |
| 3,542,157 A | 11/1970 | Noah |
| 3,651,787 A | 3/1972 | Cooper |
| 3,785,517 A | 1/1974 | Brajkovich |
| 3,788,675 A | 1/1974 | Wilander |
| 3,860,255 A | 1/1975 | Rodriguez |
| 3,861,533 A | 1/1975 | Radek |
| 3,875,672 A | 4/1975 | Castoe |
| 3,981,372 A | 9/1976 | Moreau |
| 4,015,718 A | 4/1977 | Bernard |
| 4,021,017 A | 5/1977 | Adams |

(Continued)

FOREIGN PATENT DOCUMENTS
GB   2 125 764 A   3/1984
(Continued)

OTHER PUBLICATIONS

International Preliminary Report on Patentability, mailing date of Jan. 13, 2011.

(Continued)

*Primary Examiner* — Terrell McKinnon
*Assistant Examiner* — Ingrid M Weinhold
(74) *Attorney, Agent, or Firm* — Taft Stettinius & Hollister LLP; Stephen F. Rost, Esq.

(57) ABSTRACT

An apparatus for supporting a motorcycle in an upright position. The apparatus includes a base and a wheel stop coupled thereto. A cradle is pivotally coupled to the base and includes a pair of clamp members slidably coupled thereto. The pair of clamp members are biased away from each other. In other embodiments, a chock apparatus and a method of holding a motorcycle in an upright, stable position using a chock apparatus are provided.

16 Claims, 5 Drawing Sheets

U.S. PATENT DOCUMENTS

| | | |
|---|---|---|
| 4,024,820 A | 5/1977 | Hlinsky |
| 4,026,546 A | 5/1977 | Omori |
| 4,029,330 A | 6/1977 | Runyan, Jr. |
| 4,077,607 A | 3/1978 | Lovelady |
| 4,108,425 A | 8/1978 | Crabtree |
| 4,116,341 A | 9/1978 | Hebda |
| 4,182,454 A | 1/1980 | Tohms |
| 4,189,274 A | 2/1980 | Shaffer |
| 4,273,484 A | 6/1981 | Blanar |
| 4,275,984 A | 6/1981 | Lenertz |
| 4,284,293 A | 8/1981 | Rygajlo |
| 4,315,395 A | 2/1982 | Randall |
| 4,324,384 A | 4/1982 | Elser |
| 4,334,668 A | 6/1982 | Caris |
| 4,355,807 A | 10/1982 | Prehodka |
| 4,420,164 A | 12/1983 | Mitchell |
| 4,432,562 A | 2/1984 | Cline |
| 4,437,597 A | 3/1984 | Doyle |
| 4,445,705 A | 5/1984 | Hayashi et al. |
| 4,508,233 A | 4/1985 | Helms |
| 4,541,650 A | 9/1985 | Cline |
| 4,543,030 A | 9/1985 | Hawkins |
| 4,549,722 A | 10/1985 | Gagliano |
| 4,555,089 A | 11/1985 | Eck |
| 4,563,016 A | 1/1986 | Holleron, Jr. |
| 4,592,225 A | 6/1986 | Eck |
| 4,629,104 A | 12/1986 | Jacquet |
| 4,630,700 A | 12/1986 | Larsson |
| 4,681,299 A | 7/1987 | Siebert |
| 4,686,910 A | 8/1987 | Skjerseth |
| 4,691,904 A | 9/1987 | Armstrong |
| 4,705,264 A | 11/1987 | Hawkins et al. |
| 4,723,756 A | 2/1988 | Stumpf, Jr. |
| 4,761,111 A | 8/1988 | Brown |
| 4,768,800 A | 9/1988 | Johns |
| 4,773,665 A | 9/1988 | Hindle |
| 4,796,861 A | 1/1989 | Petty |
| 4,809,963 A | 3/1989 | Kelly |
| 4,856,803 A | 8/1989 | Carter |
| 4,864,936 A | 9/1989 | Rietsch, Jr. |
| 4,899,986 A | 2/1990 | Tweedy |
| 4,915,577 A | 4/1990 | Fraser |
| 4,921,152 A | 5/1990 | Kemming |
| 4,925,203 A | 5/1990 | Buckler |
| 4,948,292 A | 8/1990 | Haven et al. |
| 5,016,893 A | 5/1991 | Hart, Jr. |
| 5,021,017 A | 6/1991 | Ott |
| 5,029,814 A | 7/1991 | Liegel et al. |
| 5,082,120 A | 1/1992 | Vega |
| 5,090,717 A | 2/1992 | Belka |
| 5,098,155 A | 3/1992 | Graber |
| 5,174,414 A | 12/1992 | Burns |
| 5,186,039 A | 2/1993 | Celette |
| 5,205,571 A | 4/1993 | Geier et al. |
| 5,211,376 A | 5/1993 | Anderson |
| 5,230,449 A | 7/1993 | Collins et al. |
| 5,230,598 A | 7/1993 | Steves, Jr. et al. |
| 5,301,817 A | 4/1994 | Merritt |
| 5,320,227 A | 6/1994 | Minoura |
| 5,323,997 A | 6/1994 | Danaj |
| 5,332,243 A | 7/1994 | Berry |
| 5,344,178 A | 9/1994 | Rohrmoser |
| 5,385,246 A | 1/1995 | Grossnickle |
| 5,462,257 A | 10/1995 | Trowbridge |
| 5,462,398 A | 10/1995 | Hymer |
| 5,464,076 A | 11/1995 | Benedetto, Jr. |
| 5,476,201 A | 12/1995 | Hall et al. |
| 5,505,425 A | 4/1996 | Shelton |
| 5,509,776 A | 4/1996 | Specht et al. |
| 5,518,224 A | 5/1996 | Anderson |
| 5,540,540 A | 7/1996 | Peterson |
| D378,155 S | 2/1997 | Bartow et al. |
| 5,598,595 A | 2/1997 | Flinchum |
| 5,609,461 A | 3/1997 | Lichtenberg |
| 5,620,197 A | 4/1997 | Howes |
| 5,639,067 A | 6/1997 | Johnson |
| 5,643,141 A | 7/1997 | Lee |
| 5,669,483 A | 9/1997 | Nolan |
| 5,675,515 A | 10/1997 | January |
| 5,687,860 A | 11/1997 | Behrens et al. |
| 5,735,410 A | 4/1998 | Kallstrom |
| 5,769,396 A | 6/1998 | Tischendorf |
| 5,775,650 A | 7/1998 | Fox |
| 5,775,870 A | 7/1998 | Hogan |
| 5,810,542 A | 9/1998 | Ostrander |
| 5,851,007 A | 12/1998 | Swartzlander et al. |
| 5,930,881 A | 8/1999 | Naruse et al. |
| 5,944,198 A | 8/1999 | Ihalainen |
| 5,971,348 A | 10/1999 | Thomas |
| 5,984,339 A | 11/1999 | Guild |
| 5,988,402 A | 11/1999 | Mayfield |
| 6,015,161 A | 1/2000 | Carlson |
| 6,019,709 A | 2/2000 | Piaget |
| 6,070,699 A | 6/2000 | Bleeker |
| 6,070,906 A | 6/2000 | Allen |
| 6,092,787 A | 7/2000 | Nayman |
| 6,095,499 A | 8/2000 | Johnson |
| 6,095,746 A | 8/2000 | Bergin |
| 6,149,180 A | 11/2000 | Haws |
| 6,234,452 B1 | 5/2001 | Johnson |
| 6,241,104 B1 | 6/2001 | Kraus |
| 6,402,756 B1 | 6/2002 | Ralph et al. |
| 6,488,157 B2 | 12/2002 | Chen |
| 6,575,310 B2 | 6/2003 | Chamoun |
| 6,640,979 B1 | 11/2003 | Mayfield |
| 6,648,300 B2 | 11/2003 | Chamoun |
| 6,755,309 B1 * | 6/2004 | Runge ............................ 211/20 |
| 6,935,619 B2 | 8/2005 | Chamoun |
| 2006/0045685 A1 | 3/2006 | Warner |
| 2006/0110212 A1 | 5/2006 | Masui |

FOREIGN PATENT DOCUMENTS

| | | |
|---|---|---|
| GB | 2 275 908 | 9/1994 |
| WO | WO 96/38336 | 12/1996 |
| WO | WO0213926 A1 | 2/2002 |

OTHER PUBLICATIONS

Written Opinion of the International Searching Authority, mailing date of Feb. 16, 2010.

* cited by examiner

CHOCK APPARATUS

RELATED APPLICATIONS

This application claims priority to U.S. Provisional Patent Application Ser. No. 61/133,468, filed Jun. 30, 2008, U.S. Provisional Patent Application Ser. No. 61/081,840, filed Jul. 18, 2008, and U.S. Provisional Patent Application Ser. No. 61/153,073, filed Feb. 17, 2009, which are hereby incorporated by reference in their entirety.

BACKGROUND

The present invention relates to a stand, and more particularly, to an apparatus for holding a motorcycle or bike in an upright position.

Conventional chocks are used for holding two-wheeled vehicles in an upright position when parked. These conventional chocks can accommodate motorcycles and/or bikes having different size tires. There are various types of motorcycle chocks, for example, that capture the front tire of a motorcycle or bike to hold the motorcycle or bike in an upright position. One type of chock operates similar to a bike rack in which the front tire of the motorcycle or bike is rolled forward over a horizontal bar and the tire fits between two vertical bars to keep the bike from tipping over. One clear disadvantage associated with this type of chock is that the two vertical bars must be spaced apart at a distance that substantially is the same as or slightly larger than the width of the tire, otherwise the weight of the motorcycle or bike can cause instability and the motorcycle or bike can fall over onto its side. Or, even worse, the width of the tire is too large to fit between the spaced bars and thus the chock is completely useless.

Another conventional chock is one that incorporates a gas cylinder to raise a lever to prevent the motorcycle or bike from rolling backwards. One limitation associated with this type of chock is that there is no corresponding pressure applied to the sides of the tire to prevent the motorcycle or bike from tipping over. Instead, these chocks generally come in various sizes to accommodate different tire widths.

Conventional chocks are limited in functionality and can be inconvenient. For example, when a bike or motorcycle is rolled onto or into a chock, the chock may not effectively hold the bike or motorcycle in a substantially upright position. As a result, the bike or motorcycle may lean to the side and thus be crashed into by another bike or motorcycle. In addition, the lack of stability may cause the bike or motorcycle to tip and/or fall over onto its side. Another disadvantage associated with conventional chocks is the lack of convenience. With most conventional chocks, for example, the chock is not always in the "ready to receive" position. This position is one in which the chock is ready or in position to receive the front or back tire of the bike or motorcycle. Instead, the rider or user of the bike or motorcycle has to manually reposition the chock to the "ready to receive" position. This, of course, takes time and energy of the user.

Thus, a need exists for a chock apparatus that can hold and maintain a bike or motorcycle in an upright orientation and, when not in use, is always in the "ready to receive" position.

SUMMARY OF THE INVENTION

In one exemplary embodiment, an embodiment for supporting a motorcycle in an upright position is provided. The apparatus includes a base and a wheel stop. The wheel stop can be coupled to the base. The apparatus also includes a cradle pivotably coupled to the base. The cradle can include a pair of clamp members slidably coupled to the cradle. The pair of clamp members is biased away from each other.

The apparatus can further include a spring disposed intermediate a first cam mechanism and a second cam mechanism. The first cam mechanism can be coupled to the cradle and the second cam mechanism can be coupled to the base such that as the cradle pivots the first cam mechanism slides along the second cam mechanism. The pair of clamp members can include a plurality of ears for clamping a wheel of the motorcycle. Alternatively, each of the pair of claim members can include a substantially uniform height from the front to the rear thereof. Also, each of the pair of clamp members can be disposed at an angle relative to a longitudinal direction.

The wheel stop can be a substantially V-shaped bracket that extends substantially vertically from the base. Further, the wheel stop or cradle can be adjustably coupled to the base along a longitudinal direction.

Unlike conventional chocks, the apparatus advantageously includes the pair of clamp members which can clamp against the side walls of the tire. In conjunction with the wheel stop, the pair of clamp members provides substantial support and stability to the motorcycle and reduces the chance of the motorcycle tipping over. Likewise, the apparatus can be lightweight so that it is easily transportable. Also, in the embodiment that includes the spring disposed intermediate the first and second cam mechanisms, the apparatus can have a relatively simple structure that is more effective at holding a motorcycle in an upright position than conventional chocks.

In another embodiment, a chock apparatus for engaging a tire is provided. The chock apparatus can include a base and a wheel stop coupled thereto. A cradle can be pivotably coupled to the base and include a plurality of clamp members configured for clamping the tire. The cradle can pivot between an entry position in which the cradle is ready to receive the tire and a clamped position in which the plurality of clamp members clamp against side walls of the tire. The chock apparatus can further include a return mechanism operably coupled to the cradle. The return mechanism tends to bias the cradle to the entry position.

The return mechanism can include a spring that is disposed intermediate a pair of cam mechanisms. The pair of cam mechanisms can include a first cam mechanism that is coupled to the cradle and a second cam mechanism that is coupled to the base. As the cradle pivots, the first cam mechanism slides along the second cam mechanism. Further, as the cradle pivots to the clamped position, the pair of cam mechanisms compresses the spring. Also, the return mechanism can bias the plurality of clamp members outwardly.

In the present embodiment, the wheel stop can be a substantially V-shaped member for engaging the tire. The substantially V-shaped member can be pivotally mounted to a post member. The post member extends substantially upright from the base. In addition, the cradle can include a curved ramp such that the plurality of clamp members is slidably coupled to the ramp.

In conventional chocks, the chock is not always in a "ready-to-receive" position (i.e., entry position). As such, a user must manually return the conventional chock to the "ready-to-receive" position. In this embodiment of the present invention, however, the chock apparatus advantageously is in the entry position when a tire is not being engaged. In other words, the return mechanism returns the cradle to the entry position when a tire is removed from the chock apparatus so that the chock apparatus is ready to receive the same or different tire at any time. This can also be called returning the chock to the preload position.

In a different embodiment, a method of holding a motorcycle in an upright, stable position using a chock apparatus is provided in which the chock apparatus includes a base, a wheel stop coupled to the base, and a cradle pivotably coupled to the base, the cradle including a plurality of clamp members coupled thereto. The method includes rolling a tire of the motorcycle into contact with the cradle in which the cradle is in an entry position. The cradle is pivoted from the entry position to a clamped position and the tire is clamped with the plurality of clamp members. The method also includes compressing a spring as the cradle pivots to the clamped position and contacting the tire with the wheel stop in the clamped position. The method further includes holding the motorcycle in an upright, stable position.

The clamping step can include sliding the plurality of clamp members along rods in a direction substantially parallel to an axis along which the cradle pivots. Further, when the tire is removed from the chock apparatus, the spring decompresses and returns the cradle to the entry position. Likewise, before use, the spring maintains the cradle in the entry position. The method can also include adjusting the wheel stop along a longitudinal direction and latching the cradle in the clamped position.

This advantageous embodiment again provides the chock apparatus in a "ready-to-receive" or preload position. In addition, the wheel stop can be adjusted along the longitudinal direction so that any tire, regardless of diameter, width, or shape, can be accommodated in the chock apparatus. This provides greater flexibility and can save the user from having to purchase additional chocks to fit different size tires. Instead, the user can park any bike or motorcycle regardless of tire size.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art can appreciate and understand the principles and practices of the present invention.

Figure 1:
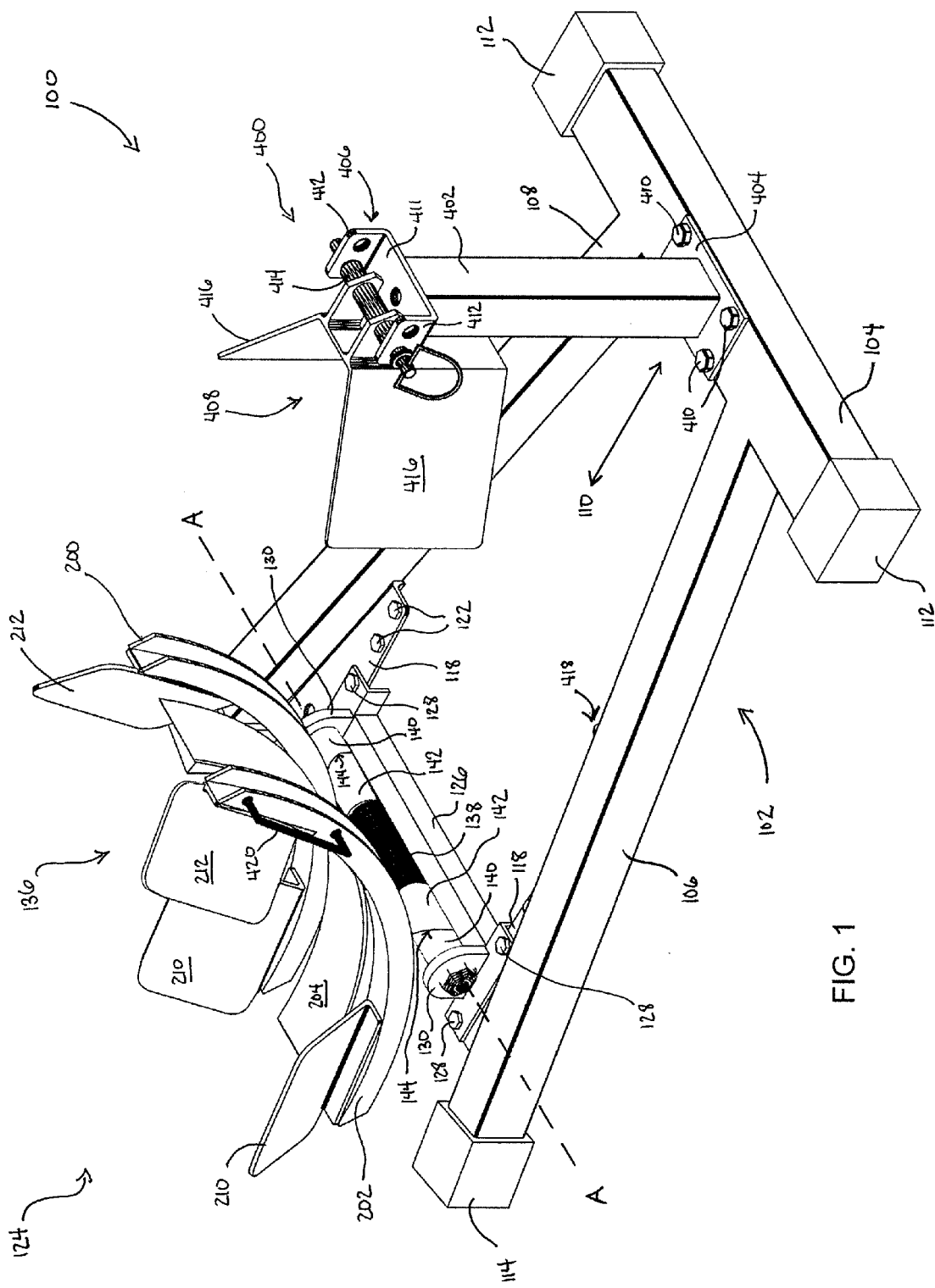
FIG. 1 is a rear perspective view of an exemplary embodiment of a chock apparatus.

An exemplary embodiment of a chock apparatus is shown in FIG. 1. The chock apparatus 100 comprises a base 102 that includes a plurality of legs. The plurality of legs can include a rear leg 104, a first front leg 106, and a second front leg 108. As will be explained in further detail below, a motorcycle or bike can be driven or moved in a longitudinal direction 110 into contact with the chock apparatus 100.

In the embodiment of FIG. 1, the rear leg 104 is substantially perpendicular to the longitudinal direction 110. The front legs 106, 108 can be substantially parallel to direction 110, or in other embodiments, the front legs 106, 108 can provide additional stability to the motorcycle or bike and be oriented at various angles relative to direction 110. The angles at which the front legs 106, 108 are oriented relative to direction 110 is generally between 0-90°, and one skilled in the art can optionally orient the legs at various angles relative to direction 110 to provide maximum stability when the motorcycle or bike is being held in an upright position. In a different embodiment, the front legs 106, 108 and rear leg 104 can include extendible portions (not shown) which can be adjustable to increase the length of each leg and provide additional support to the chock apparatus 100.

Additionally, both ends of the rear leg 104 can include feet 112 that securely fit over each end. Likewise, front feet 114, 116 can fit over the ends of front legs 106, 108, respectively. In one embodiment, the feet 112, 114, 116 can be rubber. In other embodiments, the feet 112, 114, 116 can be plastic or a composite material. The feet 112, 114, 116 are generally provided to protect the ends of the legs 104, 106, 108 and prevent the legs from scratching and sliding along the floor upon which the chock apparatus 100 rests against. The feet 112, 114, 116 can raise the legs off the ground such that the chock apparatus 100 is supported by the feet 112, 114, 116. In alternate embodiments, the feet 112, 114, 116 and legs 104, 106, 108 contact the ground and provide support to the chock apparatus 100.

In one embodiment, the base 102 is made of steel. However, in different embodiments, the base 102 can be made from aluminum, titanium, a composite material, or other material known to the skilled artisan. Additionally, the plurality of legs 104, 106, 108 can be hollow tubes with a square, circular, cylindrical, oval, polygonal, rectangular, or other shape cross-section. In another embodiment, the plurality of legs 104, 106, 108 can be solid or substantially solid. The remainder of the chock apparatus 100 can comprise the same material and shape as the base 102.

Figure 2:
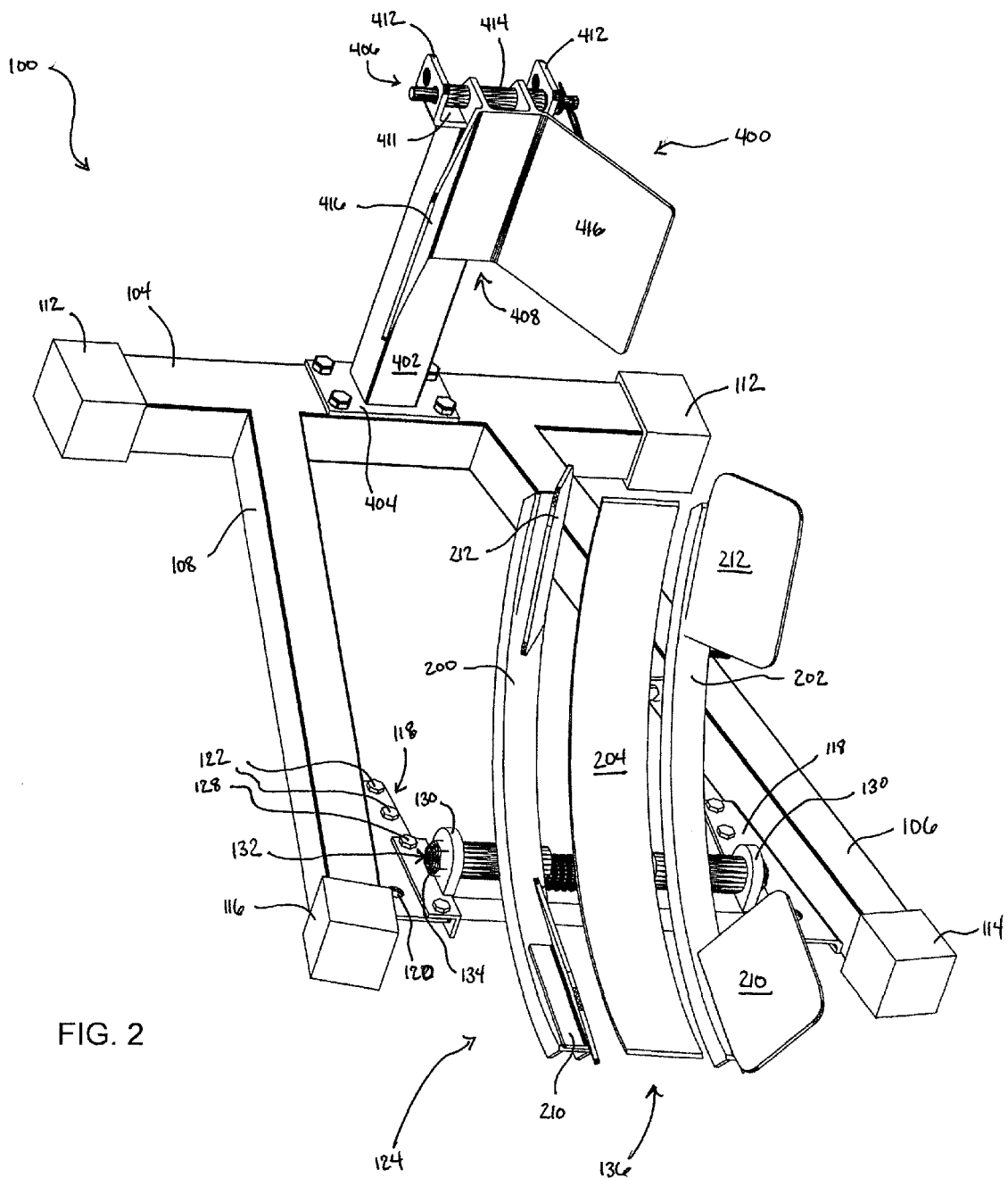
FIG. 2 is a front perspective view of the chock apparatus of FIG. 1.
Figure 3:
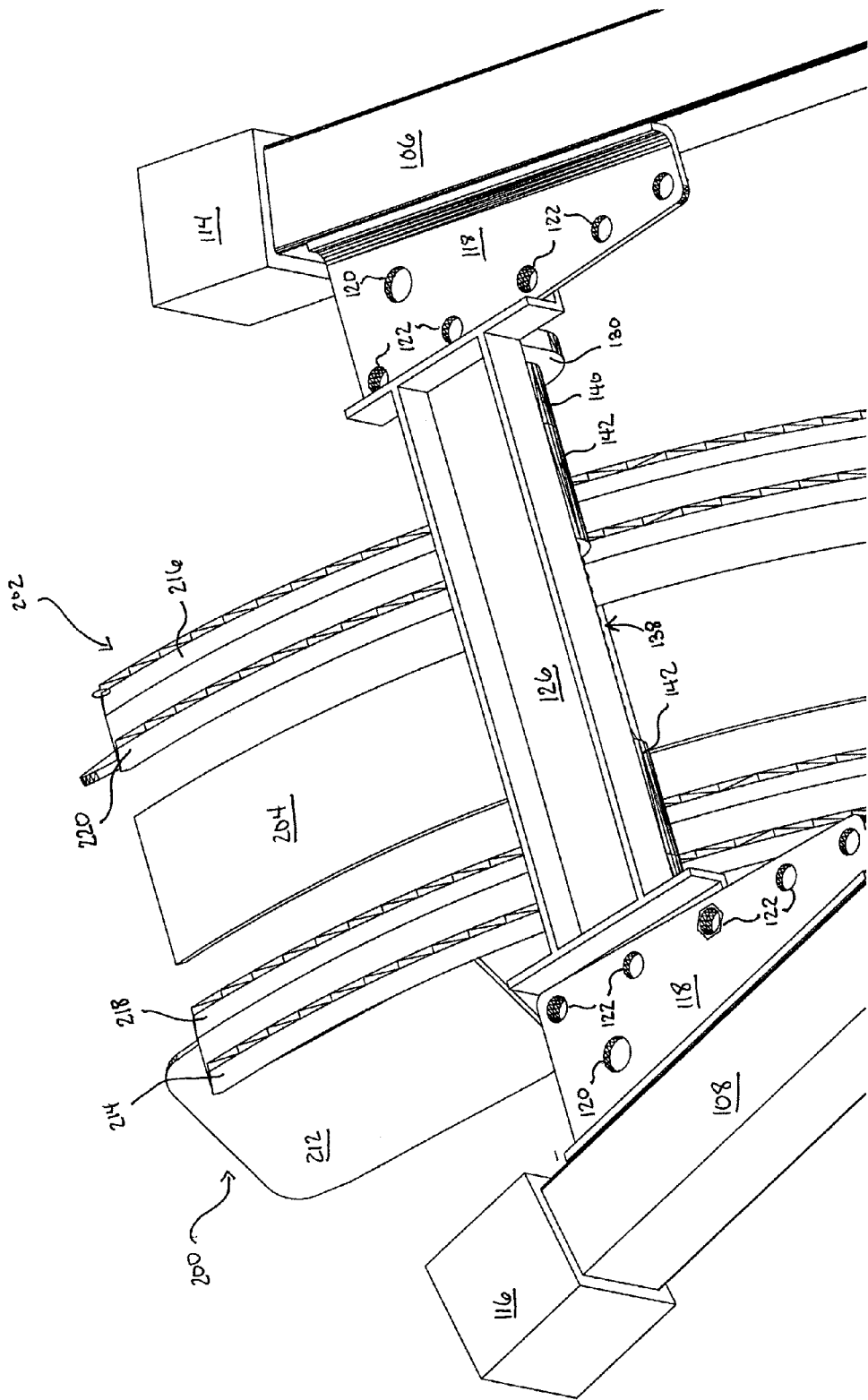
FIG. 3 is a bottom perspective view of a cradle assembly of the chock apparatus of FIG. 1.

In the embodiment of FIGS. 1-3, a plate 118 with a plurality of holes can extend along a substantially horizontal plane from the inside edge of both front legs 106, 108. The plate 118 can comprise the same piece of material as the front legs 106, 108 or it can be welded or coupled thereto. In FIG. 3, the plate 118 can include a plurality of mounting holes 120 and adjustment holes 122. Fasteners (not shown) can be inserted into the mounting holes 120 to securely mount the chock apparatus 100 to a surface such as, for example, the floor in a trailer or truck bed. The plate 118 should be durable and robust to withstand continued use.

As shown in the embodiment of FIGS. 1-3, the chock apparatus 100 can further comprise a cradle assembly 124. The cradle assembly 124 can include a transverse bar 126 that couples to each plate 118 of the base 12. As illustrated in FIG. 2, fasteners 128 can couple each end of the transverse bar 126 to each plate 118 via the adjustment holes 122 defined in each plate 118. The cradle assembly 124 can be adjusted forward or backward along direction 110 by coupling the ends of the transverse bar 126 to any of the adjustment holes 122 in the plates 118. Therefore, a motorcycle or bike with tires of different diameters and widths can be held in an upright position by the chock apparatus 100.

The cradle assembly 124 can also include a post 130 at each end of the transverse bar 126. Each post 130 has an opening to allow a pivot rod 132 to rotatably engage therein. Although not shown, in one embodiment, a bearing can be disposed within the opening in each post 130 to facilitate the pivotal movement of the pivot rod 132. In alternate embodiments, the pivot rod 132 can be fixedly coupled to the posts 130 such that the pivot rod 132 cannot move.

The pivot rod 132 can extend substantially parallel to the transverse bar 126 and couple to each post 130 via fasteners 134. In this case, the pivot rod 132 and transverse bar 126 are substantially perpendicular to the longitudinal direction 110. In other words, the pivot rod 132 lies along axis A of FIG. 1. A cradle 136, which can be coupled to the pivot rod 132, pivots or rotates about the axis A defined by the pivot rod 132 in a seesaw-like manner. In one embodiment, the cradle 136 can be fixedly coupled to the pivot rod 132 such that the cradle pivots in conjunction with the pivot rod 132. In a different embodiment, the cradle 136 can be pivotably coupled to the pivot rod 132. In this embodiment, the pivot rod 132 is fixedly coupled to the posts 130 and does not move, whereas the cradle 136 is free to pivot about the pivot rod 132. The cradle 136 will be described in further detail below.

With reference to FIG. 1, the chock apparatus 100 can further include a return mechanism. The return mechanism can include a plurality of cam mechanisms disposed intermediate each post 130 and a torsion spring 138. For instance, the plurality of cam mechanisms can include a first cam 140 and a second cam 142. The first cam 140 or torsion member can comprise the same piece of material as the post 130. In another embodiment, the first cam 140 can be made from a separate piece of material and thereby welded or coupled to the post 130. The first cam 40 can slidably engage with the second cam 142, for example, in a cam-like relationship. The second cam 142 or torsion member can be made from the same piece of material as the cradle 136 or it can be welded or coupled thereto.

In use, as the cradle 136 pivots about axis A, the first cam 140 remains fixed and does not move or pivot. The second cam 142, however, slides along the edge of the first cam 140. Further, the edges of the first cam 140 and second cam 142 which are in contact with one another are curved such that the first cam 140 slidably guides the second cam 142 along the curved edge of the first cam 140 as the cradle 136 pivots. Thus, the first cam 140 defines a curved path 144 along which the second cam 142 is guided as the cradle 136 pivots and the cradle assembly 124 thereby can clamp against a side wall of a tire.

In the chock apparatus of FIG. 1, the spring 138 can surround or coil around the pivot rod 132. In one embodiment, both ends of the spring 138 can abut against the second cam 142 and push the second cam 142 outward and into contact with the first cam 140. In the embodiment of FIG. 1, the cradle 136 is in an entry or preload position in which the cradle 136 is ready to receive but is not in contact with a motorcycle or bike. In the entry position, the spring 138 can be in a free condition or state in which it is neither compressed nor stretched. Alternatively, in the entry position, the spring 138 can be slightly compressed. For example, when the cradle 136 pivots from the entry position to a clamped position (not shown), the spring 138 may be compressed by as little as a 1-2 µm in the entry position but is then further compressed by several millimeters or centimeters in the clamped position. In other embodiments, it may be possible for the spring 138 to be partially stretched in the entry position. However, regardless of whether the spring is in a free, compressed, or stretched condition, the spring 138 biases the cradle assembly 124 to the entry position. Therefore, if a tire is removed from the chock apparatus 100, the spring 138 can automatically return the cradle assembly 124 to the entry or preload position.

In other words, in an embodiment in which the cradle 136 is in the entry or preload position, the chock apparatus 100 is ready for the motorcycle or bike to be loaded thereon. In this embodiment, for example, the spring 138 can be in its free state (i.e., neither compressed or stretched) such that the cradle 136 always returns to the entry or preload position when the weight of a tire or wheel is removed from the cradle 136. Stated differently, the weight of the tire or wheel when wheeled onto the cradle assembly 124 can compress or stretch the spring 138, and once this weight is removed from the cradle assembly 124, the spring 138 can return the cradle 136 to the entry or preload position.

In the exemplary embodiment of FIGS. 1-3, the cradle 136 can comprise a first clamp 200, a second clamp 202, and a ramp 204. The first clamp 202 and second clamp 202 are slidably coupled to the ramp 204 via a plurality of rods 206 (see FIG. 5). The plurality of rods 206 can comprise a front rod 208 (see FIG. 5) and a rear rod (not shown). The first clamp 200 and second clamp 202 can slide along the plurality of rods 206 toward and away from the ramp 204. However, the spring 138 tends to bias or direct the first clamp 200 and second clamp 202 in opposite directions (i.e., away from each other). The first clamp 200 and second clamp 202 can be angularly disposed with respect to the longitudinal direction 110. The ramp 204, meanwhile, can have a curved shape for accommodating the curvature of a tire. Alternatively, the ramp 204 can be planar or any other known shape. As a tire is wheeled onto the cradle assembly 124, the tire first contacts the ramp 204. As the tire continues moving from the front to the rear of the chock apparatus 100 along the longitudinal direction 110, the cradle 136 begins to pivot about axis A. In doing so, the ramp 204 and both clamps 200, 202 can rotate. As the cradle 136 pivots from the entry position to the clamped position, the first clamp 200 and second clamp 202 move toward one another (and the tire). In the clamped position, the first clamp 200 and second clamp 202 can engage the side walls of the tire while the tire is further supported by the ramp 204.

The first clamp 200 and second clamp 202 can also include a plurality of ears extending therefrom. For example, the first clamp 200 and second clamp 202 can include a front ear 210 and a rear ear 212 that provide an increased surface area which can clamp against the tire, and in particular a portion of the sidewalls, of the motorcycle or bike. The ears 210, 212 can be integrally formed with the first clamp 200 and second clamp 202, or alternatively, the ears 210, 212 can be coupled thereto. Also, the ears 210, 212 can be angularly disposed relative to direction 110 for accommodating different tire widths. The angle in which the ears extend from the clamps can be between 10-75°, although in other embodiments the angle can differ. In another embodiment, sleeves (not shown) can be placed over each of the ears 210, 212 to provide additional grip to the clamps 200, 202 and further protect the ears 210, 212 from normal wear. The sleeves can be made of any material such as rubber or plastic.

Figure 5:
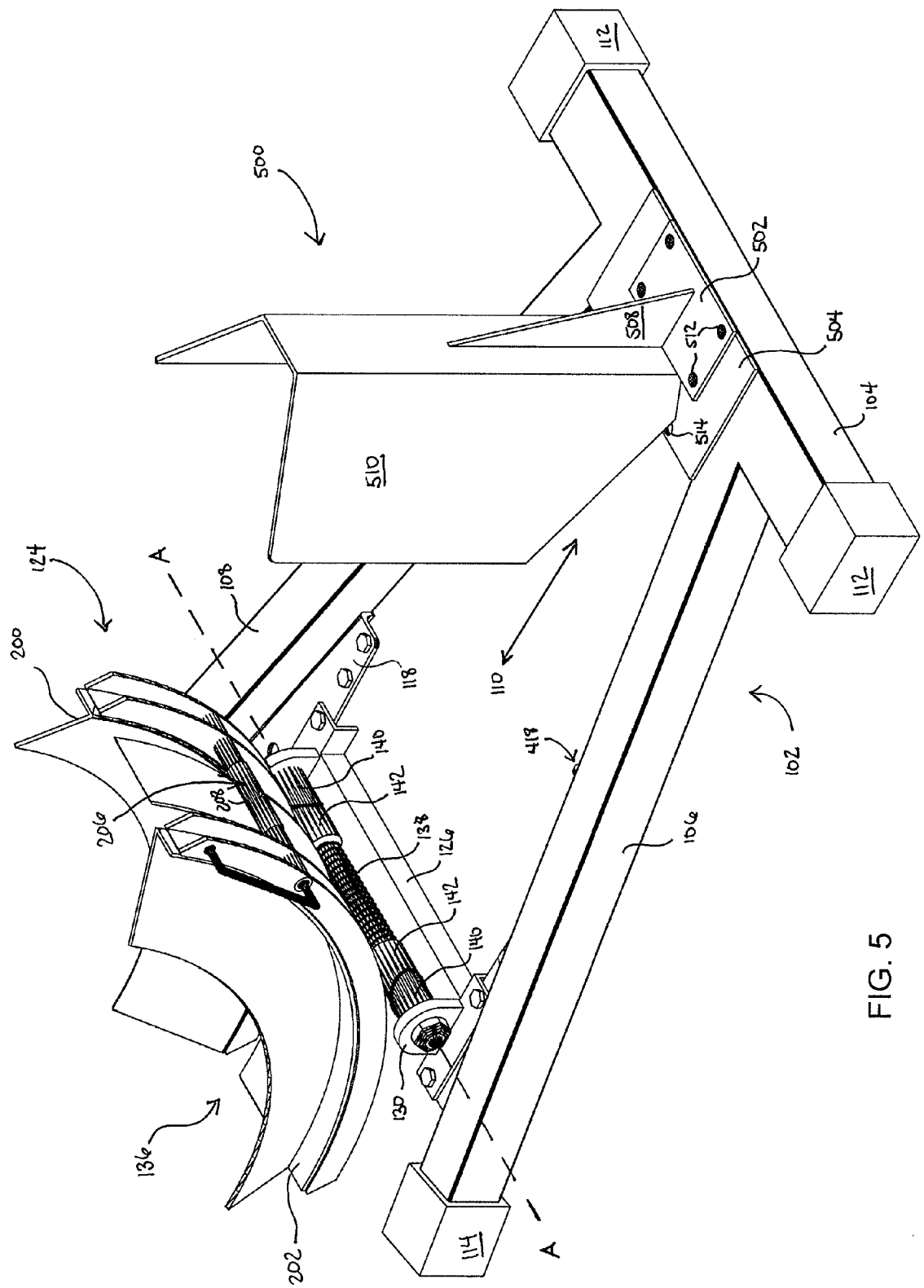
FIG. 5 is a rear perspective view of another embodiment of a chock apparatus.

In an alternative embodiment, the first clamp 200 and second 202 can have a uniform width from the front (or forward) end to the back (or rear) end of each clamp (see FIG. 5). In this embodiment, each clamp provides a maximum surface area for clamping against the sidewalls of the tire. In this respect, the first clamp 200 and second 202 can provide a more secure and stable engagement with the tire and reduces the possibility of the bike or motorcycle tipping over. In any embodiment, the first clamp 200 and second clamp 202 can be made from steel, aluminum, or any other metal. Alternatively, one skilled in the art may be able to manufacture the clamps from other material so long as the clamps are durable and robust.

As shown in the embodiment of FIG. 5, the clamps 200, 202 are slidably coupled to the ramp 204. Although not shown, the ramp 204 can include a rib that extends substantially the length of the ramp 204 and a sleeve (not shown) that slidably receives the rod 208. The first clamp 200 can include a sleeve or pocket (not shown) for slidably receiving the rod 206. Likewise, the second clamp 202 can have a corresponding sleeve or pocket (not shown) for slidably receiving the rod 206. Outer ribs 214, 216 defined on the underneath portion of the first clamp 200 and second clamp 202, respectively, can limit the distance in which the clamps 200, 202 slide outwardly along the plurality of rods 206 in a non-clamping direction (i.e., substantially parallel to axis A). In similar fashion, inner ribs 218, 220 defined on the first clamp 200 and second clamp 202, respectively, can be provided for limiting the travel of the clamps 200, 202 inwardly in a clamping direction (i.e., in a direction substantially parallel to axis A).

Further, a locking mechanism (not shown) such as a clip can be used to keep the clamps 200, 202 from sliding outwardly away from the ramp 204 and becoming completely disengaged from the sliding rods. A plurality of springs (not shown) can further bias the clamps 200, 202 away from one another such that during a clamping movement, the springs move into a compressed position. In one embodiment, the plurality of springs can be enclosed within a sleeve (not shown) defined beneath the ramp 204. In another embodiment, the clamps 200, 202 are held fixed to the plurality of sliding rods, which can slidably move within the sleeve. In this embodiment, the plurality of springs (not shown) are enclosed within the sleeve and push outward against the innermost ends of the plurality of sliding rods to bias the clamps 200, 202 outward. Other embodiments are contemplated and one skilled in the art may appreciate additional ways the clamps can be biased outward (i.e., in a direction away from the ramp 204). It is also possible that the spring 138 alone can bias the first clamp 200 and second clamp 202 in opposite directions such that the cradle assembly 124 has a tendency of returning to the entry position.

During use, as the tire moves into contact with the cradle 136, the weight of the tire applies downward pressure to the cradle 136 to prevent it from pivoting. At this point, if axis A divides the ramp 204 into a front portion and a rear portion, the tire is applying pressure to the front portion of the ramp 204. However, as the tire continues to roll forward, and particularly as the tire rotates past axis A and begins to apply pressure to the rear portion of the ramp 204, the cradle 136 begins to pivot about axis A.

As the cradle 136 begins to pivot, the first clamp 200, second clamp 202, and ramp 204 begin to pivot in the longitudinal direction 110. In the embodiment of FIG. 1, the first clamp 200 and second clamp 202 can comprise the same material as the second cam 142 (in FIG. 1, for example, there are two second cams 142, one for each clamp). In other embodiments, the second cam 142 can comprise different material than the clamps, and in these embodiments, the second cam 142 is coupled or welded to the clamps. Therefore, as the clamps 200, 202 pivot, the second cams 142 slidably rotate along the curved path 144 defined by the abutting edges of the first cam 140 and second cam 142. As described above, the first cam 140 and second cam 142 have curved edges such that as the second cam 142 begins to rotate, the curvature of these edges causes the second cam 142 to move radially inward toward the ramp 204. In effect, this also moves the first clamp 200 and second clamp 202 toward each other to clamp against the sidewalls of the tire. The clamps 200, 202 slide inward along the plurality of rods 206 and until the inner ribs 218, 220 of each clamp contact the plurality of rods 206.

As the tire continues moving in direction 110, the front edge of the tire comes into contact with a wheel stop assembly 400. With reference to the embodiment shown in FIG. 4, the wheel stop assembly 400 comprises a rear post 402, a rear plate 404 with a plurality of mounting holes defined therein, an adjustable linkage 406, and a rear stop 408. In this embodiment, the rear post 402 and rear plate 404 are made from the same material, but in other embodiments the rear post 402 can be coupled or welded to the rear plate 404. The plurality of mounting holes defined in the rear plate 404 allow the wheel stop assembly 400 to be mounted to the rear leg 104 of the base 102 via fasteners 410. The rear post 402 is oriented substantially vertical from the base 102 and can be made of the same piece of material as the adjustable linkage 406.

The adjustable linkage 406 can include a base plate 411, a plurality of posts 412, and a sleeve 414. The plurality of posts 412 can include several openings defined therein to receive a pin (not shown) and/or the sleeve 414. The openings can be aligned in the plurality of posts 412 for adjusting the position of the rear stop 408 relative to the rear post 402. The rear stop 408 can be moved forward or backward relative to the rear post 402 to accommodate tires of different sizes.

Figure 4:
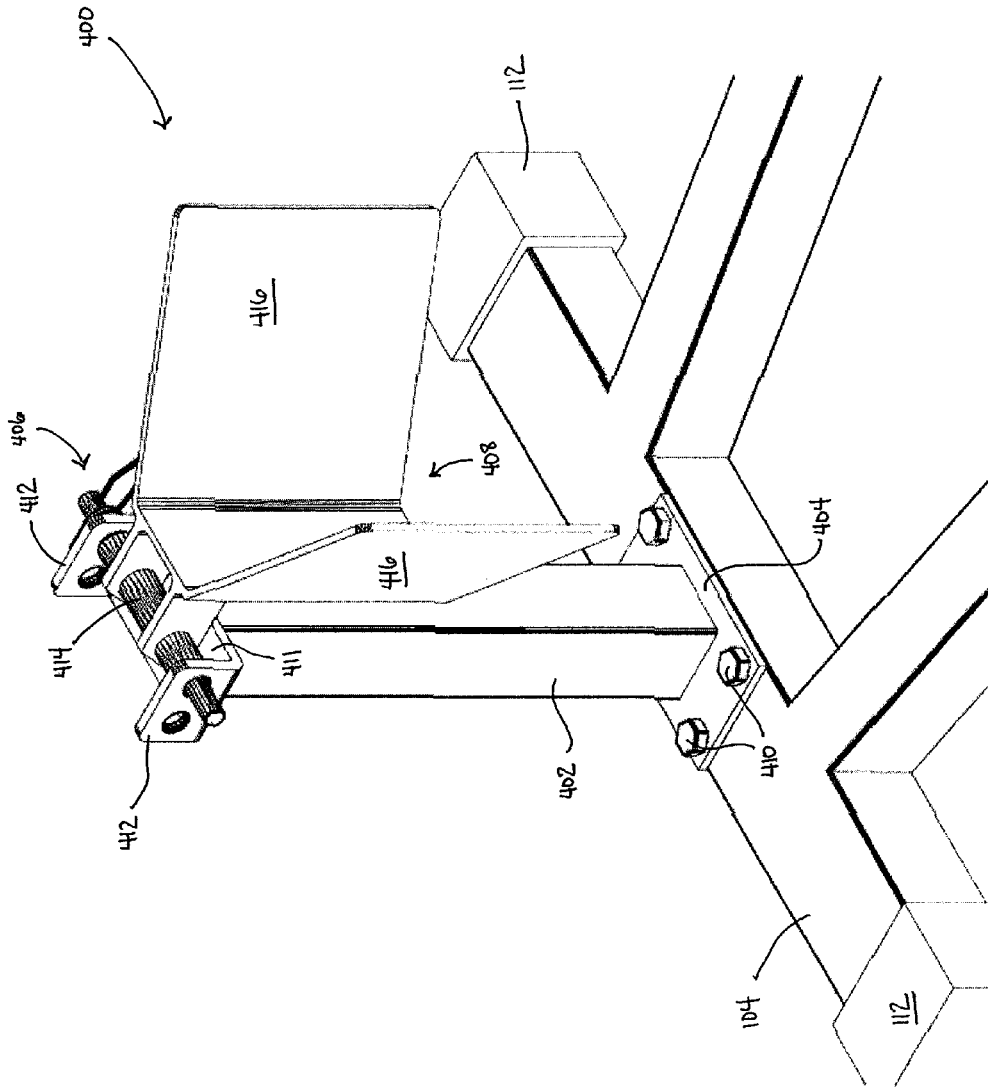
FIG. 4 is a perspective view of a stop assembly of the chock apparatus of FIG. 1.

The rear stop 408 can be made from the same material as the sleeve 414, or the stop 408 can be coupled or welded to the sleeve 414. In the embodiment of FIG. 4, the rear stop 408 has a wedge-like or substantially V-shaped design with a pair of ears 416 that angle outward relative to direction 110. The angle in which the ears 416 are oriented can be between 10-75° relative to direction 110.

As the tire rolls into contact with the rear stop 408, the cradle 136 stops pivoting and the spring 138 is compressed. In a different embodiment, the cradle 136 may pivot into contact with the floor surface shortly before the tire contacts the rear stop 408. To prevent the tire from rotating backwards and to maintain the motorcycle or bike in the upright position, an adjustable latching mechanism 418 (see FIG. 1) is provided. The adjustable latching mechanism 418 can comprise a hook that engages an opening or latch bar in either the first clamp 200 or second clamp 202. Other adjustable means for latching the cradle 136 in a latched position are contemplated and are not limited to a hook latch and latch bar 420 (the latch position can also be the same as the clamped position). A person skilled in the art can contemplate other adjustable latching means including a linkage similar to what is incorporated with a garage door and chain. Further, the adjustable latching mechanism 418 can incorporate a gas cylinder and lever, a wedge, or other means for preventing the cradle 136 from returning to the initial, entry position.

To unlatch and remove the bike from the chock apparatus 100, the adjustable latching mechanism 418 can be disengaged and the tire can be rotated backwards. As such, the cradle 136 begins to pivot from the clamped position to the entry position and the spring 138 begins to decompress and return the clamps 200, 202 to the non-clamped position. Again, even if the bike was lifted directly out of the chock apparatus 100 from the clamped position, the spring 138 will decompress and thereby return the cradle assembly 124 to the entry position. Advantageously, the user does not have to manually return the lever assembly 124 to the entry position.

With reference to FIG. 5, a different embodiment of the wheel stop assembly is provided. The wheel stop assembly 500 is adjustably coupled to the rear leg 104 by a support plate 502. The support plate 502 defines a plurality of holes 512 through which fasteners (not shown) can couple the support plate 502 to an adjustment plate 504. The adjustment plate 504 also defines a plurality of adjustment holes 514 to which the support plate 502 is coupled. The plurality of adjustment holes 514 are aligned longitudinally in the adjustment plate 504 such that the wheel stop assembly 500 can be adjusted longitudinally. This flexibility allows tires of various sizes to be accommodated in the chock apparatus 100.

The wheel stop assembly 500 also includes a V-shaped wheel stop 510. The V-shaped wheel stop 510 extends from the rear leg 104 to its maximum height. In other words, the wheel stop assembly 500 is absent a post and V-shaped shoe as in the wheel stop assembly 400 of FIG. 4. Instead, the V-shaped wheel stop 510 can include a rib 508 that provides support on the backside of the wheel stop. The V-shaped wheel stop 510 can be coupled or integrally formed with the rib 508 and/or support plate 502. The V-shaped wheel stop 510 can be made of any material including the same material as the base 102 and/or cradle assembly 124.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for supporting a motorcycle in an upright position, comprising:
    a base;
    a wheel stop coupled to the base;
    a cradle pivotably coupled to the base, the cradle including a pair of slidable clamp members;
    a spring disposed intermediate the pair of clamp members along a pivot axis, where the cradle is pivotable about the pivot axis between an entry position and clamped position; and
    a plurality of cam mechanisms, each of the plurality of cam mechanisms having a first cam and a second cam, each first cam being coupled to one of the pair of clamp members and the second cam being coupled to the base, wherein as the cradle pivots the first cam is guided along a surface of the second cam to move the clamp members toward or away from each other;
    further wherein, the pair of clamp members are biased away from each other by the spring in the entry and clamped positions.

2. The apparatus of claim 1, wherein as the cradle pivots to a clamped position, the spring is compressed and each of the plurality of first cams moves along the surface of each of the plurality of second cams.

3. The apparatus of claim 1, wherein the pair of clamp members comprises a plurality of ears for clamping a wheel of the motorcycle.

4. The apparatus of claim 1, wherein each of the pair of clamp members comprises a substantially uniform height from the front to the rear thereof.

5. A chock apparatus for engaging a tire, comprising:
    a base and a wheel stop coupled thereto;
    a cradle pivotably coupled to the base, the cradle having a plurality of clamp members configured for clamping the tire, such that the cradle pivots about a pivot axis between an entry position in which the cradle is ready to receive the tire and a clamped position in which the plurality of clamp members clamp against side walls of the tire;
    a plurality of cam mechanisms each of which include a first cam coupled to one of the plurality of clamp members and a second cam mounted to the base, wherein as the cradle pivots, the first cam moves along a curved surface of the second cam to move the clamp members toward or away from each other; and
    a return mechanism operably coupled to the cradle and disposed along the pivot axis in the entry and clamped positions, wherein the return mechanism tends to bias the cradle to the entry position.

6. The chock apparatus of claim 5, wherein the return mechanism comprises a spring disposed intermediate the plurality of clamp members.

7. The chock apparatus of claim 6, wherein, as the cradle pivots to the clamped position, the plurality of cam mechanisms compresses the spring.

8. The chock apparatus of claim 5, wherein the return mechanism biases the plurality of clamp members outwardly.

9. The chock apparatus of claim 5, wherein the wheel stop comprises a substantially V-shaped member for engaging the tire.

10. The chock apparatus of claim 9, wherein the substantially V-shaped member is pivotably mounted to a post member, the post member extending substantially upright from the base.

11. The chock apparatus of claim 5, wherein the cradle comprises a curved ramp, the plurality of clamp members slidably coupled to the ramp.

12. The apparatus of claim 1, wherein the wheel stop is adjustably coupled to the base along a longitudinal direction.

13. The apparatus of claim 12, wherein the cradle is adjustably coupled to the base along the longitudinal direction.

14. The chock apparatus of claim 5, wherein the wheel stop is adjustably coupled to the base along a longitudinal direction.

15. The chock apparatus of claim 14, wherein the cradle is adjustably coupled to the base along the longitudinal direction.

16. The chock apparatus of claim 5, further comprising a plurality of plates coupled to the base, the plurality of plates defining openings to mount the base to a ground surface upon which the apparatus rests.

* * * * *